(12) United States Patent
Oey

(10) Patent No.: US 10,391,656 B2
(45) Date of Patent: Aug. 27, 2019

(54) NON-SLIP RULER FOR QUILTING

(71) Applicant: Robin G. Oey, Belchertown, MA (US)

(72) Inventor: Robin G. Oey, Belchertown, MA (US)

( * ) Notice: Subject to any disclaimer, the term of this patent is extended or adjusted under 35 U.S.C. 154(b) by 175 days.

(21) Appl. No.: 15/598,308

(22) Filed: May 17, 2017

(65) Prior Publication Data

US 2018/0001498 A1 Jan. 4, 2018

Related U.S. Application Data

(60) Provisional application No. 62/352,230, filed on Jun. 20, 2016.

(51) Int. Cl.
| | | |
|---|---|---|
| *B26B 29/06* | (2006.01) | |
| *B43L 12/00* | (2006.01) | |
| *D05B 97/12* | (2006.01) | |
| *G01B 3/04* | (2006.01) | |
| *G01B 1/00* | (2006.01) | |
| *B05D 1/02* | (2006.01) | |

(52) U.S. Cl.
CPC .............. *B26B 29/06* (2013.01); *B43L 12/00* (2013.01); *D05B 97/12* (2013.01); *G01B 1/00* (2013.01); *G01B 3/04* (2013.01); *B05D 1/02* (2013.01)

(58) Field of Classification Search
CPC ......... B26B 29/06; B43L 12/00; D05B 97/12; G01B 1/00; G01B 3/04; B05D 1/02
USPC .......... 33/1 B, 483, 484, 488, 489, 492–494, 33/564, 566
See application file for complete search history.

(56) References Cited

U.S. PATENT DOCUMENTS

| | | | | |
|---|---|---|---|---|
| 2,230,010 A | * | 1/1941 | Owens ................... | B43L 12/00 33/379 |
| 2,246,491 A | * | 6/1941 | Abell ..................... | B43L 7/02 33/489 |
| 3,633,299 A | * | 1/1972 | Westin ................... | G09F 21/04 40/592 |
| 5,557,996 A | * | 9/1996 | Reber .................... | B25H 7/02 30/292 |
| 6,740,355 B2 | * | 5/2004 | Thiemann ............ | A01K 5/0114 427/180 |

(Continued)

OTHER PUBLICATIONS

Video shown on website at URL http://blocloc.com/rulers/, approximately 3/4 of way down page, under heading "Non Slip Rulers"; video linked from https://vimeo.com/162733441. Video appears to by posted to Vimeo by STARSTREAM PRODUCTIONS, LLC. Bloc Loc site appears to feature Janna Thomas. Date of posting or creation is unclear.

*Primary Examiner* — Justin Seo
*Assistant Examiner* — Tania C Courson
(74) *Attorney, Agent, or Firm* — Hubert W. Pfabe

(57) ABSTRACT

A device for measuring fabric and methods of making the device in accordance with the present disclosure are primarily characterized by a substantially rigid translucent base material and a flexible removable coating which resists the movement of the fabric. The removable coating is applied in liquid form, such as through spraying, and can cure at room temperature and under ambient lighting. The removable coating may be configured to be selectively removable, such that a user may selectively modify the degree to which the base removable coating resists movement of the fabric. In one embodiment, the liquid form of the removable coating is sprayed through a template so as to cure into a plurality of separately removable sections.

19 Claims, 20 Drawing Sheets

(56) References Cited

U.S. PATENT DOCUMENTS

| | | | | |
|---|---|---|---|---|
| 6,854,189 | B2 * | 2/2005 | Schafer | B26B 29/06 33/1 B |
| 7,281,337 | B1 * | 10/2007 | Oehlke | D05B 97/12 33/566 |
| 7,287,339 | B2 * | 10/2007 | Robertson | B43L 13/028 33/19.2 |
| 7,509,745 | B2 * | 3/2009 | Schafer et al. | B26B 29/06 33/1 B |
| 8,011,111 | B2 * | 9/2011 | Brady | G01B 3/004 33/494 |
| 9,126,388 | B2 * | 9/2015 | Neu | B32B 3/30 |
| 10,087,334 | B2 * | 10/2018 | Sun | C09D 133/14 |
| 2007/0148409 | A1 * | 6/2007 | Rios | A43B 13/22 428/167 |
| 2008/0249207 | A1 * | 10/2008 | Whiteley | C09D 133/08 523/122 |
| 2009/0025245 | A1 * | 1/2009 | Brady | B26B 29/06 33/562 |

* cited by examiner

NON-SLIP RULER FOR QUILTING

This application claims the priority of U.S. Provisional Patent Application No. 62/352,230 filed on Jun. 20, 2016, the disclosure of which is incorporated herein in its entirety.

BACKGROUND

The present disclosure relates generally to devices for measuring and aiding in marking or cutting of substantially flexible materials or materials with a low coefficient of friction. More particularly, the present disclosure relates to a quilting ruler with a non-slip coating to prevent fabric from easily shifting while being measured, marked, cut, or when slipping of the fabric relative to the ruler is otherwise undesirable.

Rulers for aiding in quilting and other work with various cloth and fabrics are well known in the art. These rulers generally include a series or grouping of markings, such as a plurality of lines corresponding to different units of measurement. These lines are used by the quilter to measure the material, and the ruler is regularly also used to mark the material as well as to guide a cutting tool, when needed. It is often beneficial for the ruler to be translucent or, preferably, transparent, so that the fabric underneath the ruler can be visible to the quilter while using the ruler. To this end, it is known in the art to use transparent materials, such as clear acrylic, in the manufacture of quilting rulers. However, when measuring, marking, or cutting a piece of cloth or fabric, it is important to the quilter that the fabric not unintentionally move relative to the ruler. A material such as acrylic, with a typically smooth bottom surface contacting the fabric, may allow the fabric to slip easily. To try to prevent this, the user of the ruler must apply pressure to the fabric through the ruler. However, this pressure may need to be significant, making it difficult to use the ruler to hold the fabric in place and simultaneously measure, mark, or cut the fabric. Even when pressure is applied, the fabric may still move under the ruler.

Complicated means have been designed to prevent slipping of the ruler on the fabric. These designs include handles to attempt to make it easier to stabilize the ruler, additional features, such as rubber feet, and pins which protrude through the base of the ruler. Rough surfaces have also been added to rulers, as well as rigid structures or elements. These methods tend to not be effective, are often cumbersome, can damage the fabric being measured, marked, or cut, can be expensive to manufacture, and, at best, offer the user the option of a predetermined amount of grip on the fabric, or none at all.

SUMMARY

The disclosure relates to an improved measuring device for fabric, which can minimize relative movement of the fabric while it is being measured, marked, or cut. The disclosure is concerned with an improved, removable, flexible coating which is applied to a bottom surface of a rigid ruler base so that the ruler resists movement of the fabric without requiring an excessive amount of pressure, as well as a method of manufacturing the same.

In a preferred embodiment, the spray-on coating comprises a rubberized material which can cure at room temperature and under ambient lighting to form a coating with a coefficient of friction that is higher than that of the rigid ruler base, resisting the movement of the fabric without requiring excessive or significant force. A spray-on coating which cures at elevated temperature or under specialized lighting may be used, though it is more preferable for the spray-on coating to require neither special heating nor lighting in order to cure. When a coating is used that can cure at room temperature or under ambient lighting, it may gain the benefit of not necessitating special environmental controls, equipment, and associated time and costs. It is preferable that the coating, when cured, remains substantially flexible at room temperature and is removable from the measuring device. The coating may be removed by peeling it off of the base, either in its entirety or in sections. The coating preferably does not require any special tools, heating, or chemical compounds in order to be removable from the base. A petroleum-based coating may be used, and a rubberized material coating may preferably be used so as to maintain flexibility after curing while also having a high coefficient of friction. Examples of such coating materials, which may be translucent or transparent and may be sprayed on, include LeakSeal®, manufactured by Rust-Oleum®, and Performix® brand Plasti Dip®, manufactured by Plasti Dip International, though other materials with similar properties may also be used. The coating layer thickness may vary, from below 0.5 mm thick to more than 5 mm, depending on the use and size of the measuring device and desired transparency, peelability or resistance to removal, frictional coefficient, and other properties. Greater or lesser thicknesses of coating may also be used, depending on the application and intended materials and environments of use.

The measuring device may be used as a straight edge to aid in cutting of fabric, though curved edges may also be used, such as when a curved cutting guide is desired. The device may include markings to aid in measuring fabric. In some embodiments, these markings comprise a plurality of lines which denote increments of 1", ½", and ¼", as well as lines which describe 90 degree and 45 degree angles. Other increments and angles may also be used, including, but not limited to, ⅛", 30 degrees, or 60 degrees. These markings may be multiple colors or may all be a single color, and may also have varying thicknesses or saturations of color, or include multiple lines, so as to create bolder markings at certain intervals or locations, such as at 1" increments. Markings, such as numbers, may also be within various shapes, such as a rectangle, and may be against a different color background, such as when differentiating between numbering for right-handed and left-handed measuring. In a preferred embodiment, the markings are on the top surface of the rigid ruler base. By having all of the markings be on the ruler base, and, more specifically, on the top of the ruler base, the functionality of the markings does not need to be lost by peeling away the removable coating. If the markings are not in direct contact with the removable coating then they do not need to be damaged or themselves peeled off when the coating is removed. It may also be desirable that the ruler base be translucent or transparent, and that the coating be at least translucent, and preferably transparent, when fully cured. Translucence and transparency improve the visibility through the measuring device to the fabric with which the coating is in contact. In a preferred embodiment, the ruler base is made of clear acrylic, though other translucent or transparent materials, such as styrene, PET (polyethylene terephthalate) or variants such as PETG (polyethylene terephthalate glycol-modified), or other materials known in the art, may also be used.

Different users of the measuring device may have varying preferences for how much frictional resistance they desire between the measuring device and the fabric beneath it. Similarly, different fabrics will slip or be gripped by the coating layer to different degrees. Depending on the preferences of the user, the fabric being used, and the environment or given project, the user may wish to customize the frictional resistance between the coating layer and the fabric. A method of modifying the frictional resistance of the coating layer may include having that coating layer comprise a plurality of selectively removable sections. The selectively removable sections of the coating layer may be large portions of the entire surface, or may comprise a plurality of small selectively removable sections, or a combination of both. Substantially all of the coating layer may be selectively removable as geometric sections, or only one or more small subsections may be removable, while a larger portion of the coating layer remains on the bottom of the measuring device, maintaining a substantial proportion of the original frictional resistance of the coating layer. The entire coating layer may also be removable. The coating layer may comprise substantially rectangular, substantially triangular, or substantially hexagonal selectively removable sections. The coating layer may comprise other shapes, such as ovals or circles, though rectangles, triangles, and hexagons, or combinations thereof, may be desirable, as they may to be more easily formed into substantially contiguous patterns.

The selectively removable sections of the coating layer may be created through a number of different methods. In one embodiment, the liquid coating is applied to substantially the entirety of the bottom surface of the ruler base. Depending on the viscosity of the spray-on coating material, the coating may be scored to create weak points in the cured coating layer before curing, during curing, or after curing. The coating layer scoring may define a plurality of gaps, or may comprise indentations or other variances in the coating layer. The variances in the coating layer may create stress or stretch foci when peeling the coating layer, causing it to separate selectively into sections. In an alternate embodiment, gaps or troughs may be mechanically formed in the coating layer, such as through passing a cutting tool through the coating layer to create pathways, substantially separating the coating layer into a plurality of sections. Variances in the coating layer may also be created by applying a press to the coating layer which may include prominent features to shape pathways in the coating layer, or may include proud points or edges to score or stamp the coating layer.

In an alternate embodiment, the liquid coating may be applied in a selective pattern, through painting or spraying, so as to cure into separately removable sections. The liquid coating may also be applied to the bottom of the ruler base through a template or through a screen, so as to cure into separate sections of coating layer. The template may be used to create gaps or pathways which separate the coating layer into separately peelable sections or portions. The coating layer may also vary in thickness across the bottom of the measuring device. A screen may be used to permit more or less flow of liquid coating to different areas on the bottom surface of the ruler base, thus creating different thicknesses of coating when cured. The coating layer may also be applied through a means such as spraying, where time of spraying may be varied along different portions of the base so as to create different thicknesses of coating layer. Varying the thickness of the coating may be used to create weaker areas of coating which would guide how the coating layer tears or separates when sections are selectively peeled off of the bottom of the ruler base.

In a further alternate embodiment, a preliminary coating may be applied to the bottom of the ruler base. This preliminary coating may be applied selectively, such as in a pattern or through a template or stencil, and may be a liquid or a powder. The preliminary coating may be selected such that, upon later application of the liquid coating, the preliminary coating selectively prevents or reduces the adhesion of areas of the liquid coating to the bottom of the ruler base, making portions of the coating layer more easily removable. Reduction of adhesion may also be beneficial over the entirety of the bottom surface of the ruler. It may be desirable to use a material, such as styrene, while wishing to improve the peelability and reduce the adhesion of the coating layer. The preliminary coating may also or alternatively prevent areas of the liquid coating from fully curing at room temperature and under ambient light. Such a preliminary coating may be applied in sections or patterns so as to create weak points, scoring, or pathways in the cured coating layer to enable the coating layer to be selective removable. The preliminary coating may also be applied in sections or patterns so as to create gaps or voids in the coating layer, including patches of coating with reduced friction. In another embodiment, the preliminary coating may increase adhesion of the coating layer to the bottom surface of the ruler base, making portions of the coating layer more difficult to peel or otherwise remove.

It is to be understood that the above mentioned features and the features yet to be explained hereinafter can be used not only in the respectively mentioned combination but also in other combinations or alone without departing from the context of the present invention and disclosure.

BRIEF DESCRIPTION OF THE DRAWINGS

The invention is now disclosed in detail with reference to exemplary embodiments shown in the accompanying drawings, where.

DETAILED DESCRIPTION

Exemplary embodiments of the disclosure are illustrated in the Figures and are explained in the following description in more detail, wherein identical reference numbers refer to identical, or similar, or functionally identical components.

Figure 1:
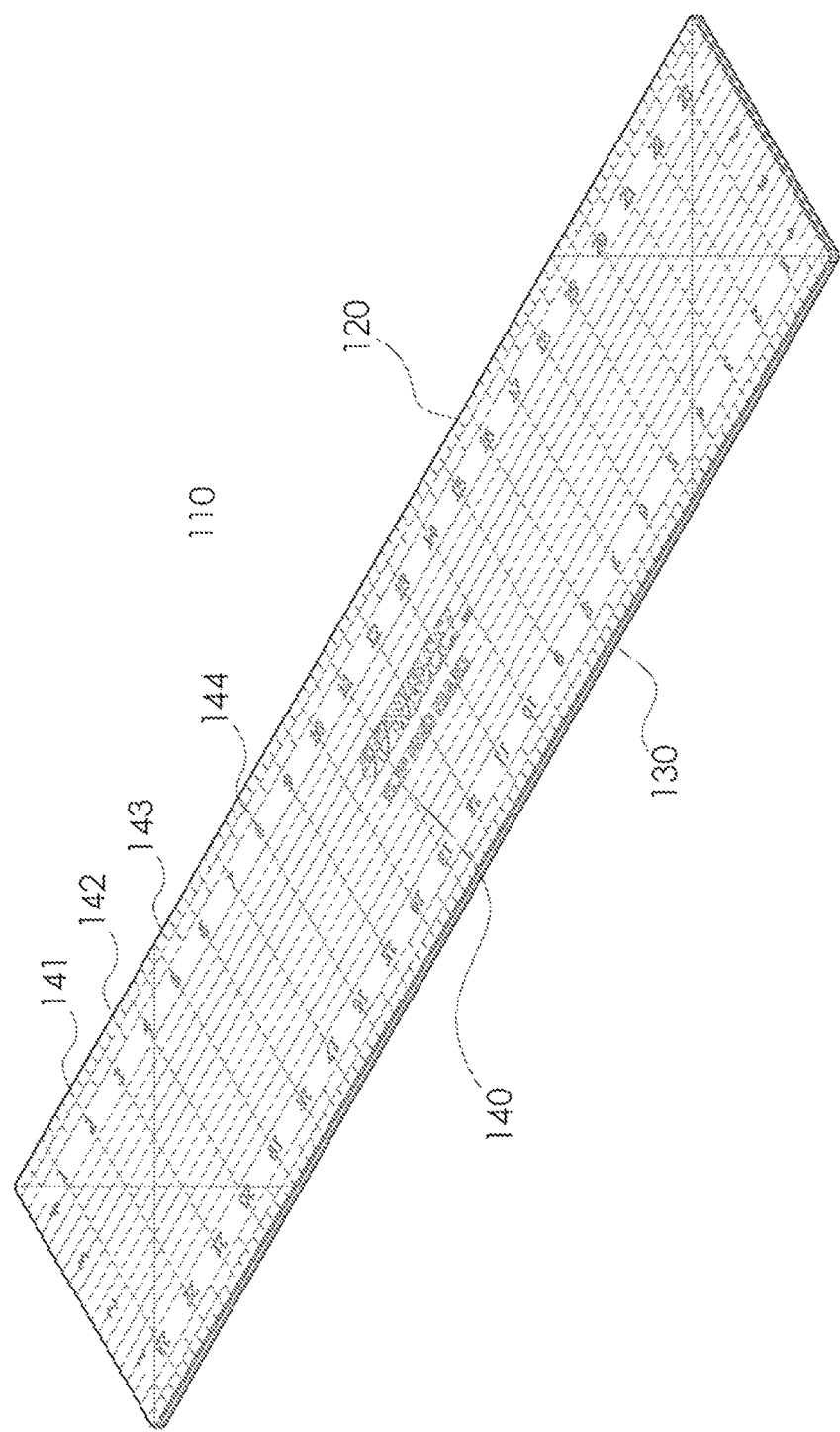
FIG. 1 shows an isometric view of one embodiment of a quilting ruler which includes markings and a coating of non-slip material of the present disclosure.

FIG. 1 shows an isometric view of an embodiment of a quilting ruler 110 comprising a ruler base 120 and an embodiment of a coating layer 130 according to aspects of the disclosure. The coating layer 130 is on the bottom, material-facing surface of the quilting ruler 110. The ruler base 120 is formed of a substantially rigid and substantially transparent material. In a preferred embodiment, the ruler base 120 is formed of a material which may be transparent, such as acrylic, PET, or styrene, allowing the user of the quilting ruler 110 to see through the quilting ruler 110 to the material beneath the bottom surface. The ruler base 120 may be machined from stock material, molded complete, molded and then finish machined, surface milled, additively manufactured, three-dimensionally printed, or formed through other known manufacturing techniques. In one embodiment, the ruler base 120 is substantially rectangular and, in one embodiment, is 24" long and 5" wide. Other embodiments may include, but are not limited to, lengths of 12", 18", 30", and 36". Embodiments need not be limited to full inch increments, but may be sized unevenly when desired, such as 2½" or 6½". The ruler base may be substantially rectangular, or may be other shapes, such as a triangle, a circle or other oval, a hexagon, octagon, or other polygon, dresden shape, or may be a compound shape, such as a t-shape. The ruler base is preferably ⅛" to 3/16" thick, though it is understood that this thickness may be varied and may be thicker or thinner so to achieve preferred transparency, rigidity, and other properties, including but not limited to 1/16" thickness and ½" thickness. The ruler base may define one or more openings, which may be used for tracing through the ruler, pinning through the ruler, hanging the ruler, or for any other purpose.

The coating layer 130 is applied to the bottom surface of the quilting ruler 110 as a coating, preferably through a spraying process. The coating layer 130 provides a greater frictional coefficient than the finished ruler base 120, allowing the bottom of the quilting ruler 110 to resist the motion of fabric during usage of the quilting ruler 110, such as during measuring, marking, or cutting of fabric. The coating layer 130 may comprise a relatively high friction coating substance, such as a rubberized material. The ruler base 120 and the coating layer 130 are each preferably translucent, and are each even more preferably transparent, allowing the user of the quilting ruler 110 to have substantial visibility of the fabric through the quilting ruler 110. The coating layer 130 may be a spray-on coating and may have greater flexibility than the ruler base 120. It is preferable that the coating layer 130 be able to be peeled off of the ruler base 120 by the user so as to selectively control the amount of coating on the bottom surface of the quilting ruler 110, and thus adjust the friction of the bottom surface of the quilting ruler 110 and its grip on the fabric. It is preferable that the coating layer 130 be able to be applied to the ruler base 120 at room temperature. It is also preferable that the coating layer 130 does not require heat or UV light in order to cure. The coating layer 130 is preferably 0.5 mm thick to 5 mm thick, and even more preferably 1 mm thick, though it is understood that this thickness may be varied and may be thicker or thinner to achieve desired transparency, peelability or adhesion, frictional coefficient, or other properties for various environments, materials, or applications.

In the embodiment shown in FIG. 1, the quilting ruler 110 also includes markings 140 on the top surface, opposite the bottom, material-facing surface. In this embodiment, the markings 140 may include linear measurement points at 1" markings 141, ½" markings 142, and ¼" 143 markings. The 1" intervals are numbered with sequential numerals 144 and are bold. It should be understood that the numerals 144, the 1" interval line markings 141, both the numerals 144 and the 1" line markings 141, or any combination of the markings 140 may be bold. All or some of the markings 140 may also be proud from or sunk within the top surface of the ruler base 120, or a combination of both. In this embodiment, the ½" and ¼" intervals are not numbered and are not bold. Interval markings are preferably along each edge of the quilting ruler 110 to allow for use in any orientation. Each end of the quilting ruler 110 also preferably includes one or more 145 degree lines, preferably forming an "X" at each end, though other angles may also be used. Additional text, logos, and imagery may also be present. It is understood that different markings 140 may be preferred for different applications, and that different shapes of rulers may also necessitate different markings 140. In a preferred embodiment, all or most of the markings 140 are on the ruler base 120, and more preferably on the top surface of the ruler base 120, and not on the coating layer 130. The markings 140 may be engraved, silk screened, or printed through a number of known industry techniques. By having the markings 140 on the top surface of the ruler base 120, the markings 140 are not disturbed, damaged, or removed by peeling away or otherwise removing any portion of the coating layer 130.

Figure 2:
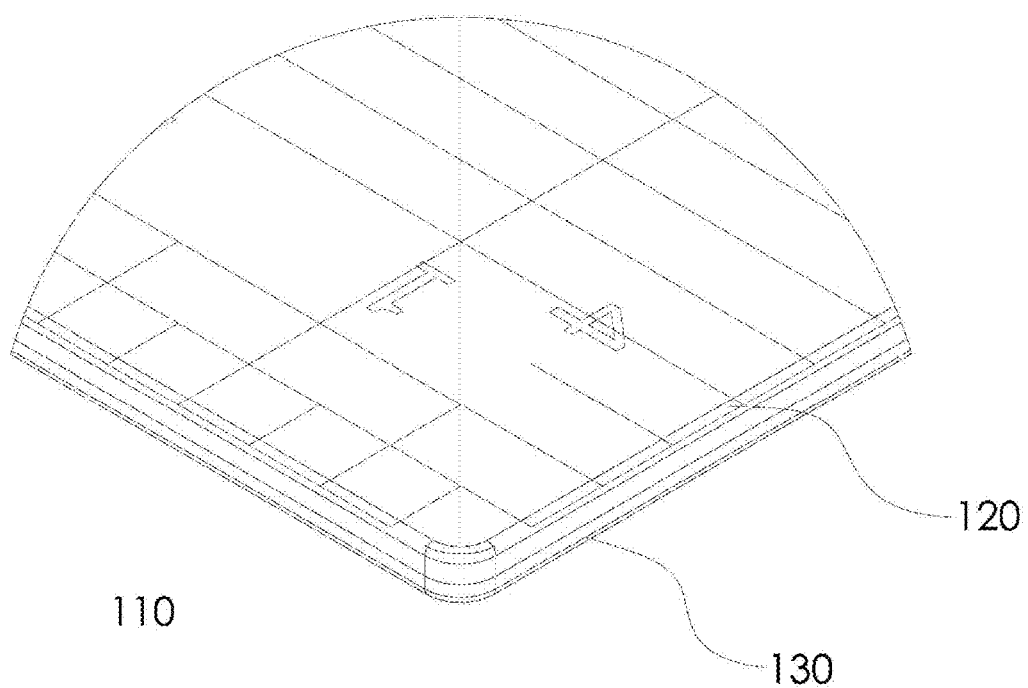
FIG. 2 shows a detail view of the embodiment of FIG. 1.

FIG. 2 shows a detail view of the embodiment of FIG. 1. In this embodiment, the edges of the ruler base 120 are rounded so as not to present any sharp points. It should be understood that corners and edges of the ruler base 120 may be rounded, chamfered, or may present a sharp edge, including substantially square corners and edges. This embodiment also shows the coating layer 130 applied to the bottom surface of the ruler base 120.

Figure 3:
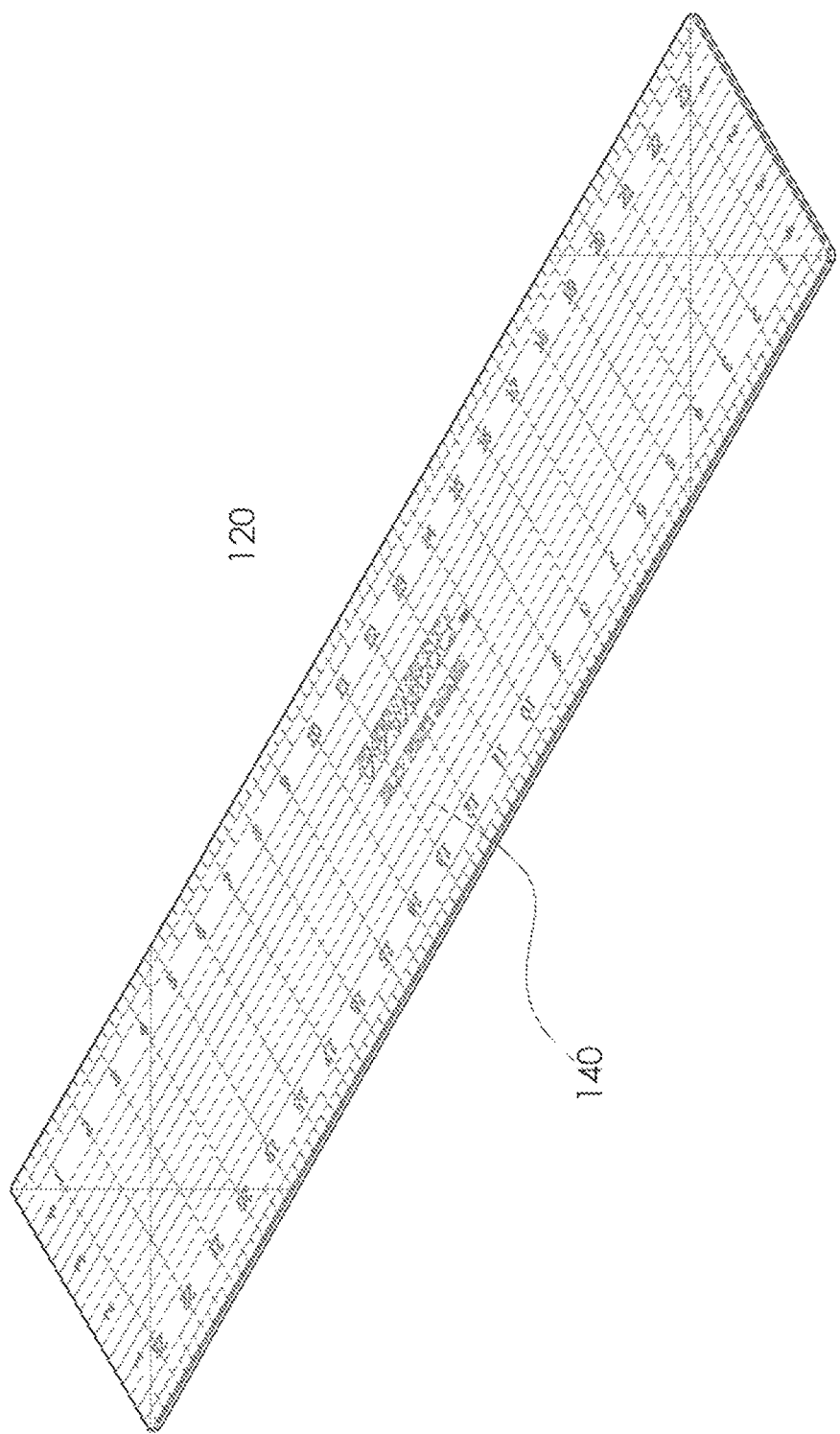
FIG. 3 shows an isometric view of an embodiment of the ruler base with markings of the present disclosure.

FIG. 3 shows an isometric view of the ruler base 120 of the embodiment of FIG. 1, including markings 140. The markings 140 are preferably on the top surface of the ruler base 120. Edges and corners of the ruler base 120 may be rounded or chamfered prior to applying the coating layer 130, though sharp edges and substantially square corners may be preferable for some applications. Edges and corners may be left sharp, or chamfers, fillets, or other break edges may be applied or molded without deviation from the intent and spirit of this disclosure.

Figure 4:
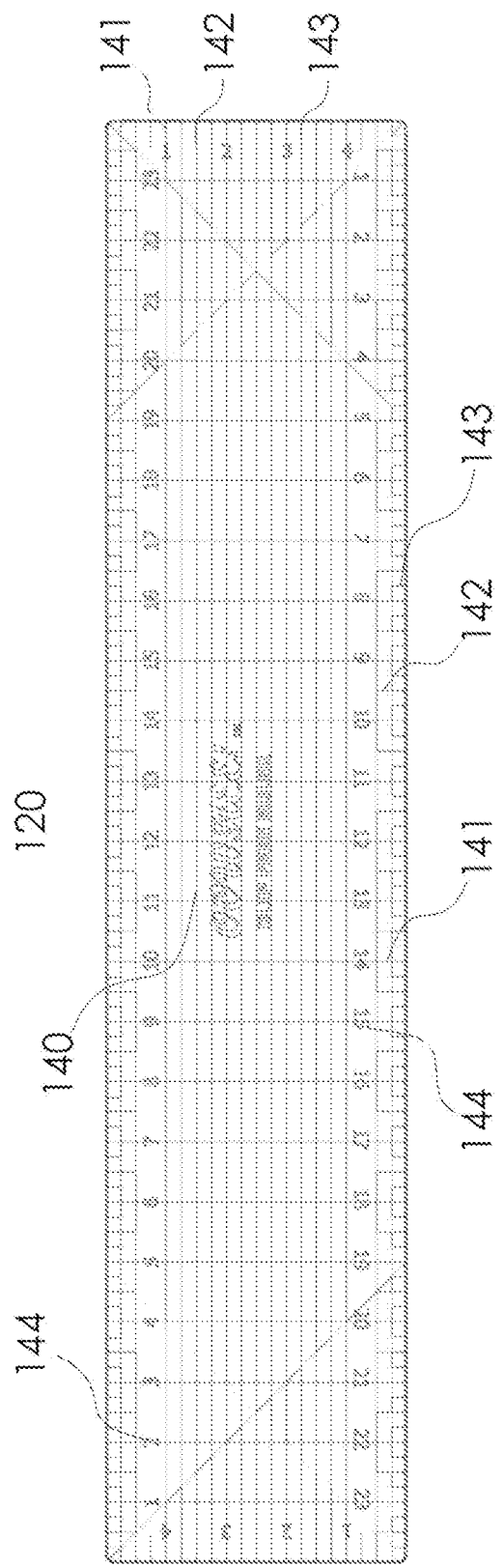
FIG. 4 shows a top view of the embodiment of FIG. 3.

FIG. 4 shows a top view of the ruler base 120 of the embodiment of FIG. 1. Markings 140, including the 1" markings 141, ½" markings 142, ¼" markings 413, and numerals 144, are preferably on the top surface of the ruler base 120.

Figure 5:
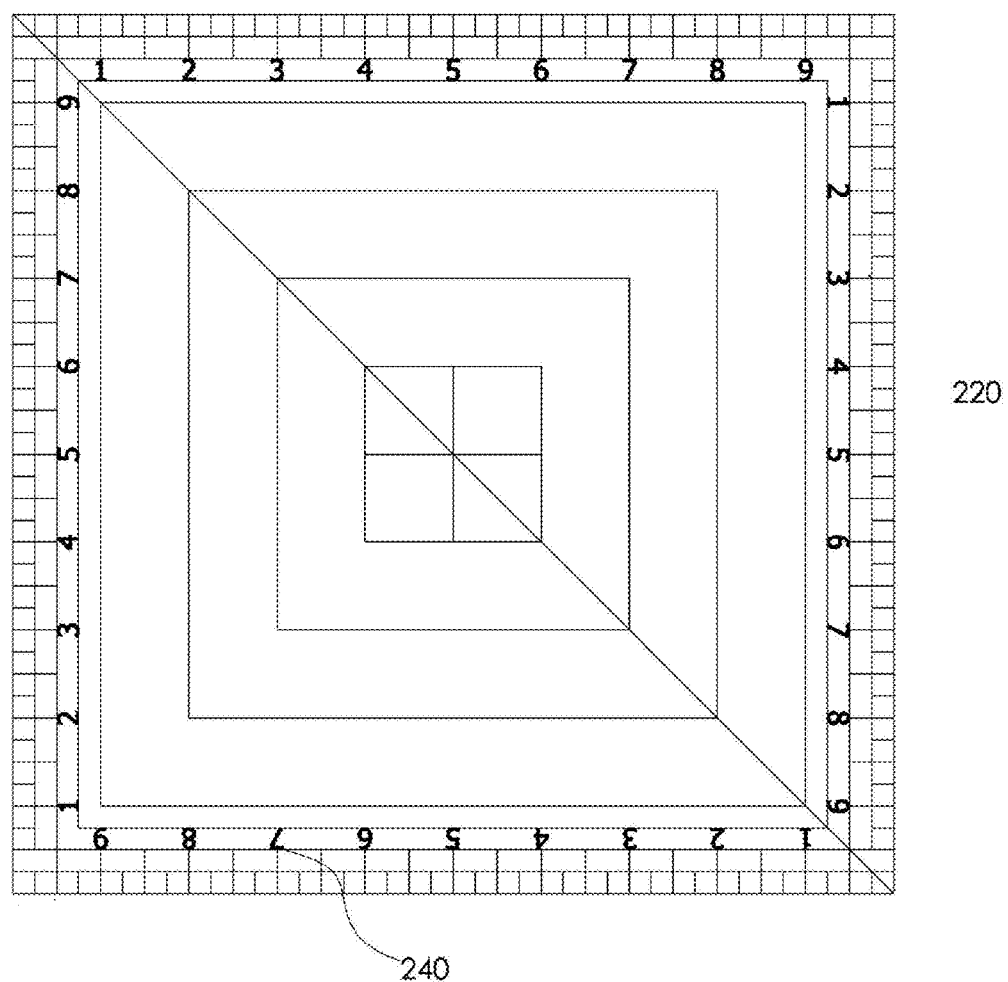
FIG. 5 shows a top view of an alternate square embodiment of the ruler base of the present disclosure.

FIG. 5 shows a top view of an alternate embodiment of the ruler base 220. The ruler base 220 may be substantially square to allow for additional applications or per the preferences of the user. Markings 240 may be varied to match particular intended uses or shapes of the ruler base 220. The ruler base 220 may be manufactured in a variety of sizes, including, but not limited to, 2"×2", 2½"×18", 4"×4", 5"×5", 5"×24", 5½"×5½", 6"×6", 6½"×12", 8"×8", 8½"×8½", 10"×10", 10½"×10½", and 12"×12", though it is understood that smaller and larger sizes, including 1"×1" and 36"×36", may also be manufactured.

Figure 6:
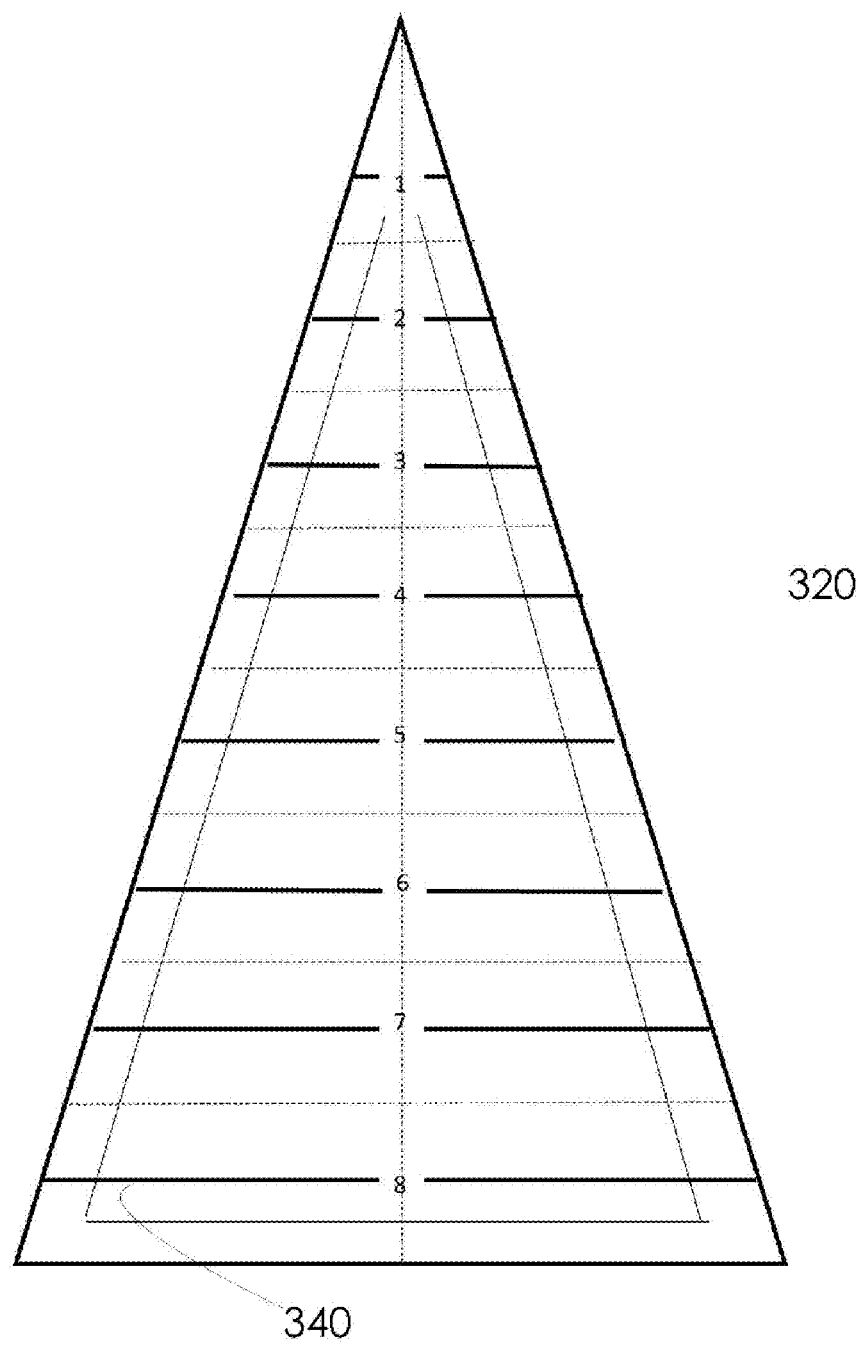
FIG. 6 shows a top view of a substantially triangular embodiment of the ruler base of the present disclosure.

FIG. 6 shows a top view of a substantially triangular embodiment of the ruler base 320. Markings 340 may be varied to match particular intended uses or shapes of the ruler base 320. The ruler base 320 may be a substantially equilateral triangle, though it may also be a right triangle or an isosceles triangle, as well as triangles with varying angles and dimensions for specific intended uses. The ruler base 320 may be manufactured in a variety of sizes, including, but not limited to, sides that are 2", 4", 6", 8", 10", and 12", though it is understood that smaller and larger sizes, including 1" and 36", may also be manufactured.

Figure 7:
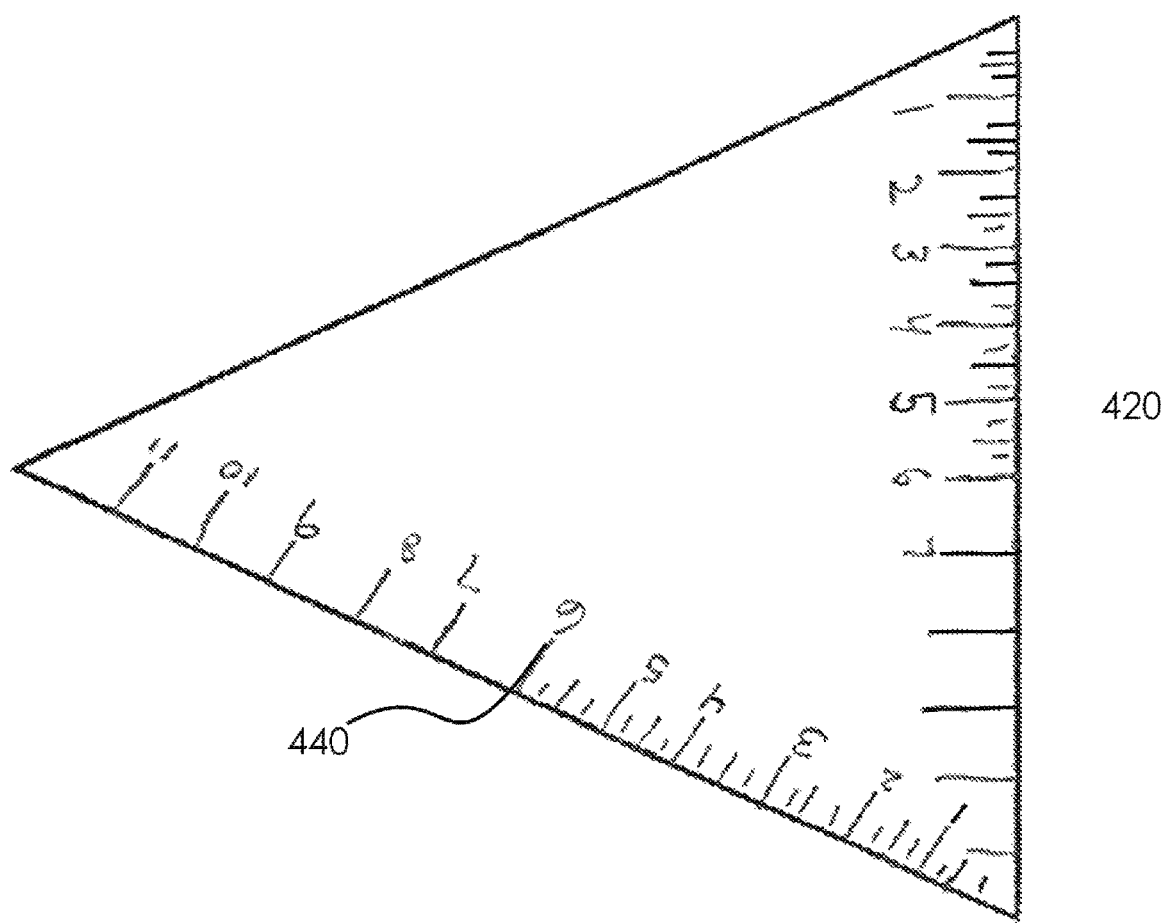
FIG. 7 shows a top view of an alternate triangular embodiment of the ruler base of the present disclosure.

FIG. 7 shows a top view of an alternate substantially triangular embodiment of the ruler base 420, including alternate markings 440.

Figure 8:
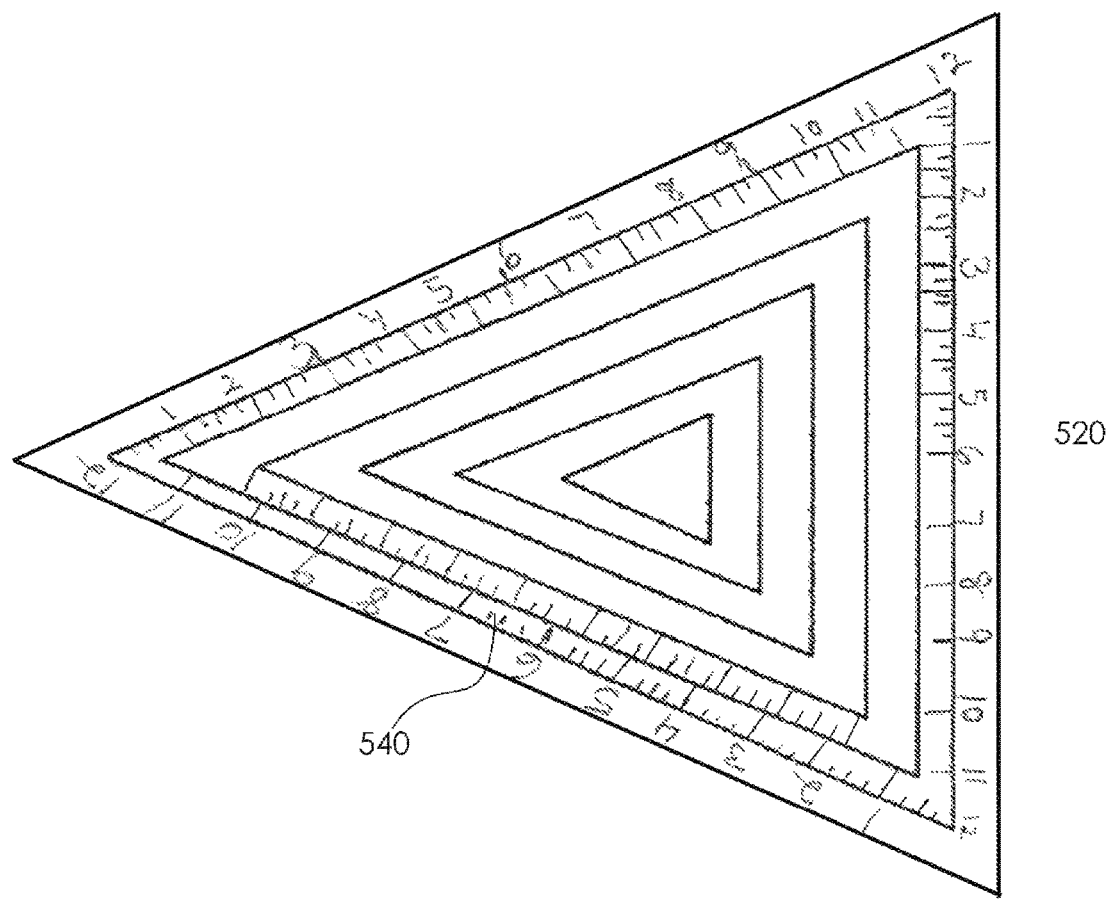
FIG. 8 shows a top view of another alternate triangular embodiment of the ruler base of the present disclosure, including an alternate pattern of markings.

FIG. 8 shows a top view of another alternate substantially triangular embodiment of the ruler base 520, including alternate markings 540.

Figure 9:
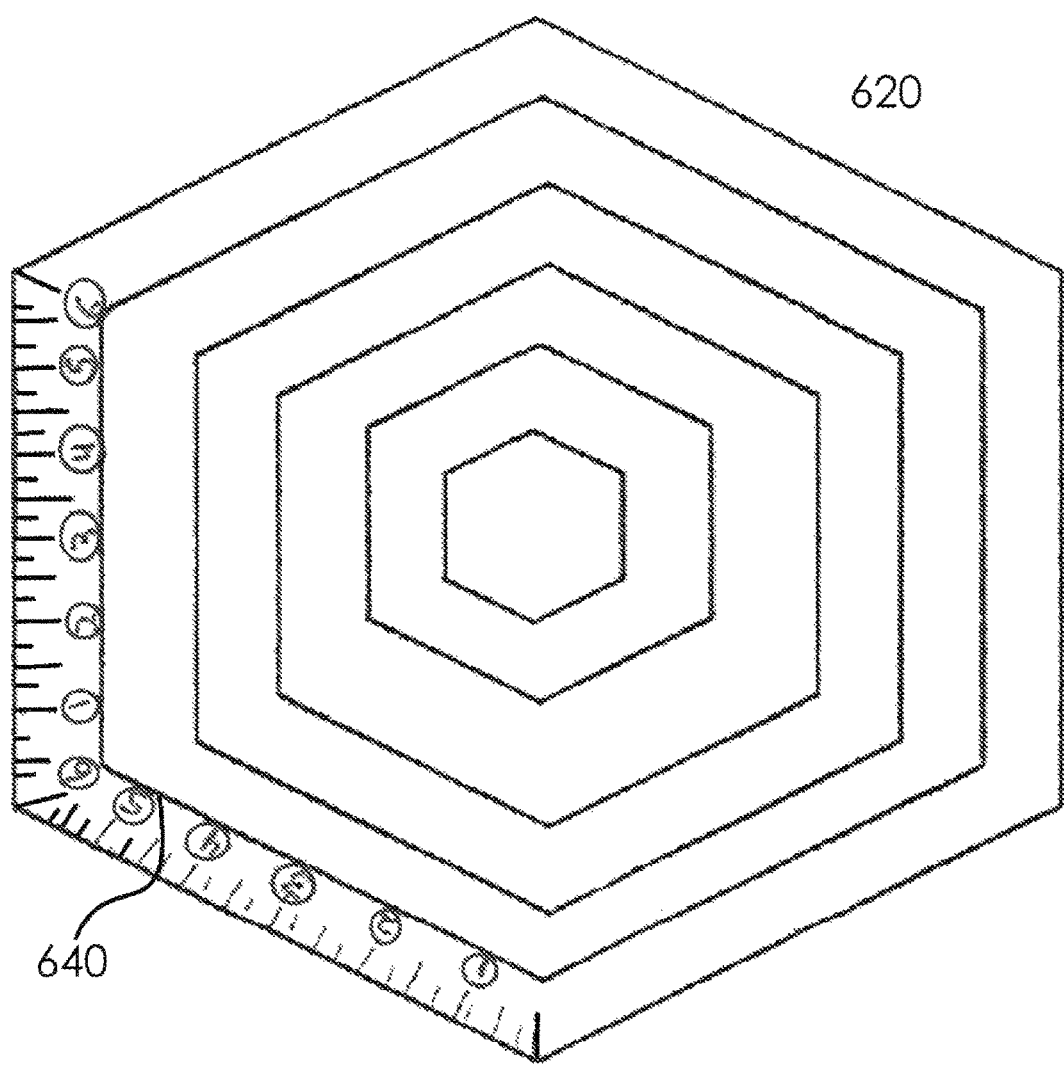
FIG. 9 shows a top view of an alternate hexagonal embodiment of the ruler base of the present disclosure.

FIG. 9 shows a top view of an alternate substantially hexagonal embodiment of the ruler base 620. Markings 640 may be varied to match particular intended uses or shapes of the ruler base 620. The ruler base 620 may be manufactured in a variety of sizes, including, but not limited to, sides that are 2", 4", 6", 8", 10", and 12", and opposing vertices that are 2", 4", 6", 8", 10", or 12" apart, though it is understood that smaller and larger sizes, including 1" and 36", may also be manufactured.

Figure 10:
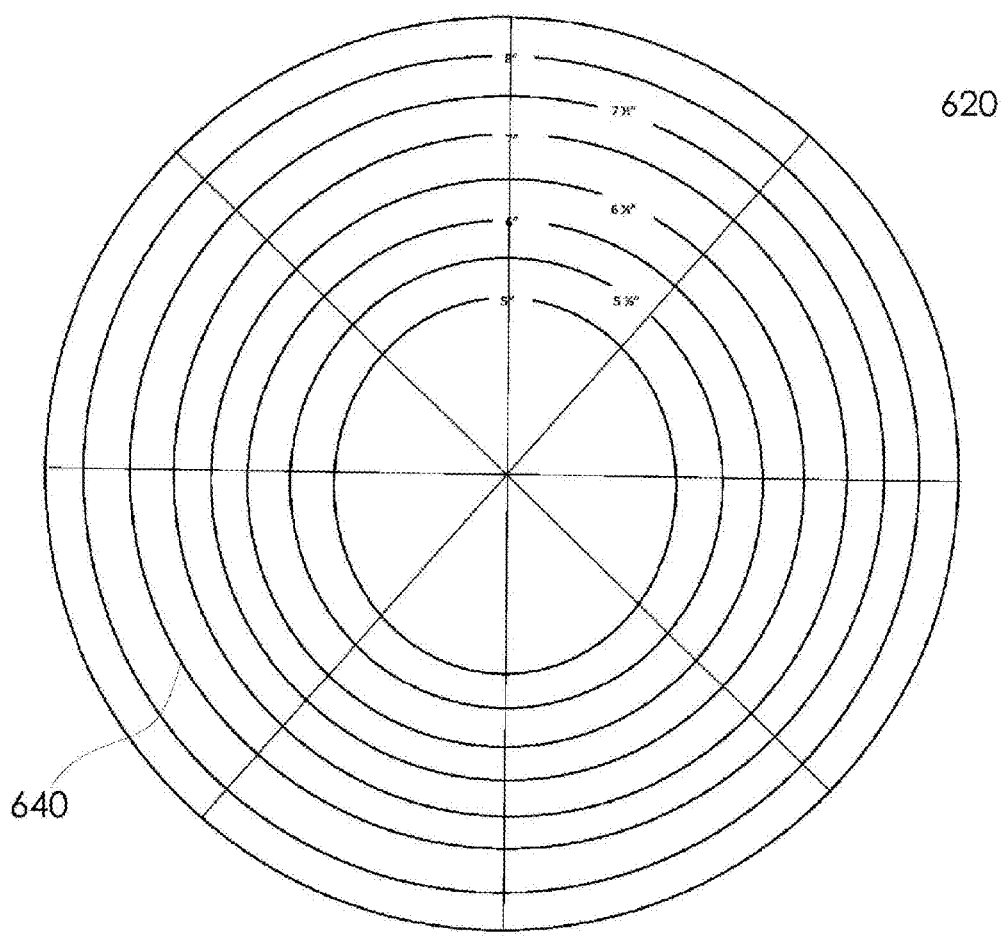
FIG. 10 shows a top view of an oval embodiment of the ruler base of the present disclosure.

FIG. 10 shows a top view of a substantially circular oval embodiment of the ruler base 720, including alternate markings 740.

Figure 11:
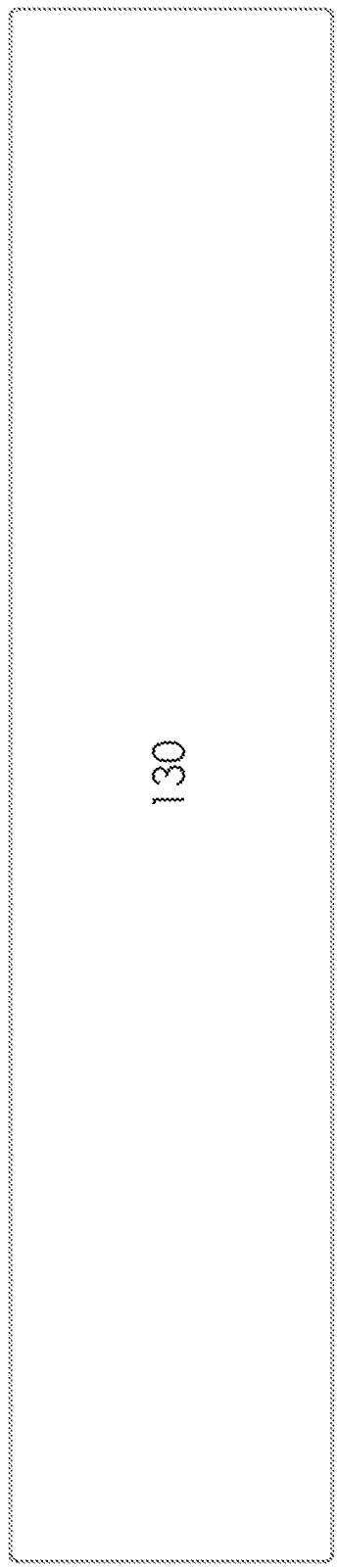
FIG. 11 shows a bottom view of the applied coating of an embodiment of the present disclosure.

FIG. 11 shows a bottom view of the coating layer 130 of an embodiment of the present disclosure. In the embodiment shown, the coating layer 130 covers substantially the entire bottom surface of the ruler base 120 and is sprayed on so as to substantially conform to the size and shape of the ruler base 120.

Figure 12:
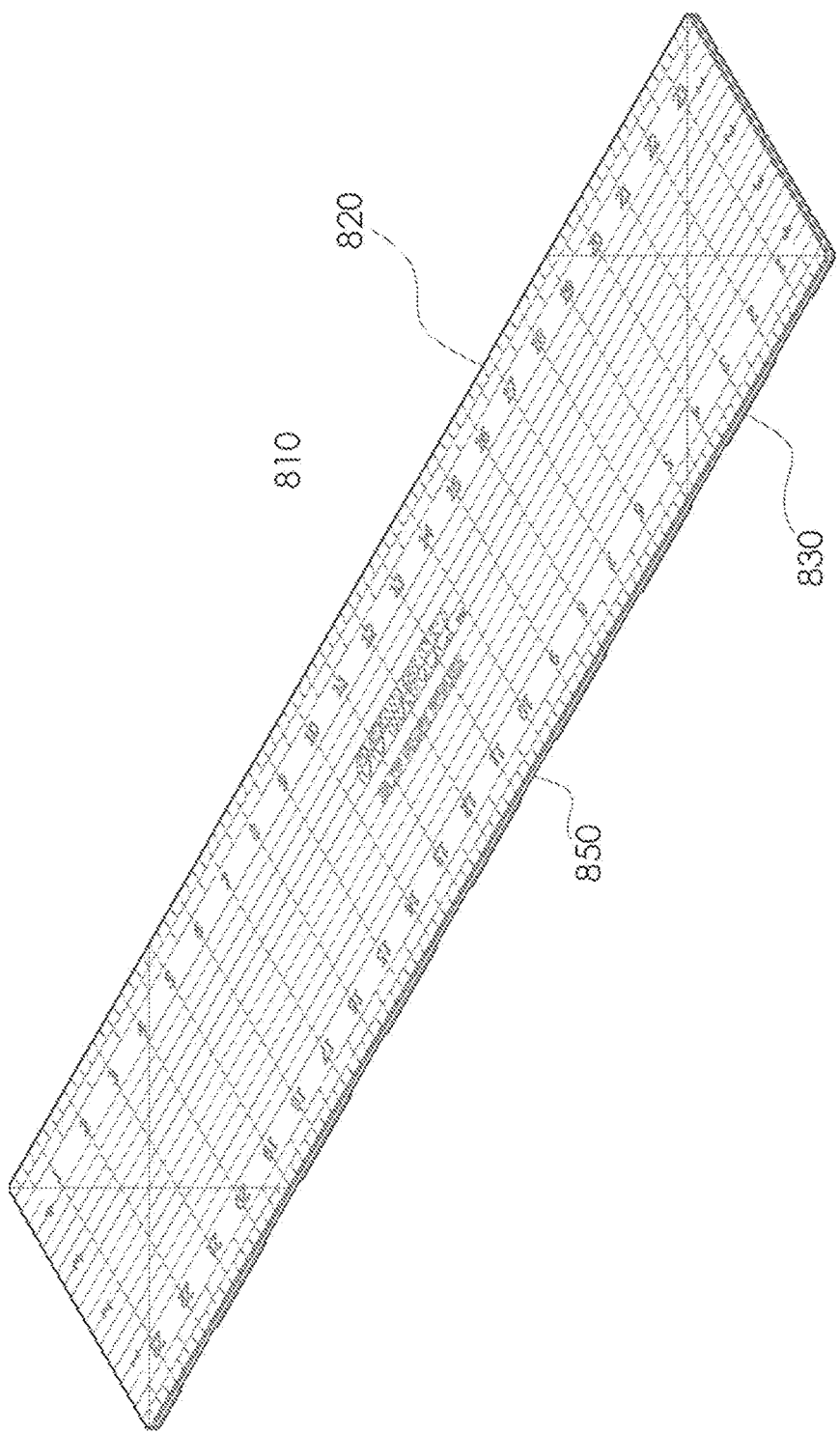
FIG. 12 shows an isometric view of an alternate embodiment of a quilting ruler which includes markings and a coating of non-slip material of the present disclosure.

FIG. 12 shows an isometric view of an alternate embodiment of a quilting ruler 810 comprising a ruler base 820 and a coating layer 830. In this embodiment, the coating layer 830 is applied to the bottom surface of the ruler base 820 so as to be selectively peelable. One or more gaps 850 are present between sections of the coating layer 830. When a section of the coating layer 830 is peeled off of the bottom of the quilting ruler 810, the gaps 850 permit other sections of the coating layer 830 to remain in place and on the bottom surface of the quilting ruler 810. This allows the user to selectively alter the cumulative friction of the bottom of the quilting ruler 810 and customize how it holds the fabric in place during use.

Figure 13:
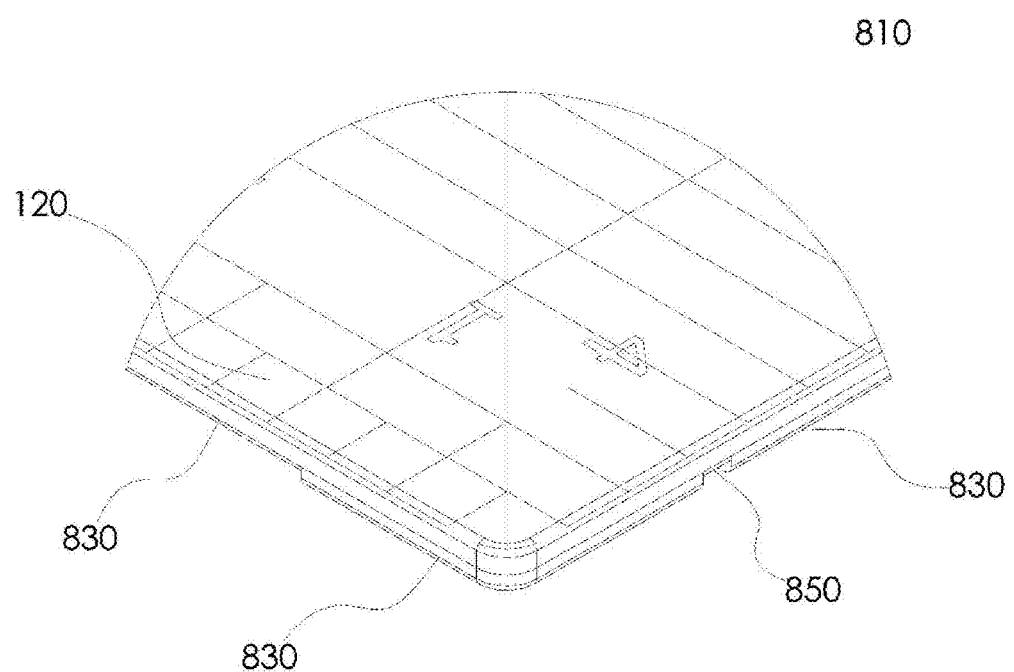
FIG. 13 shows a detail view of the embodiment of FIG. 12.

FIG. 13 shows a detail view of the quilting ruler 810 of FIG. 12. Gaps 850 separate sections of the coating layer 830.

Figure 14:
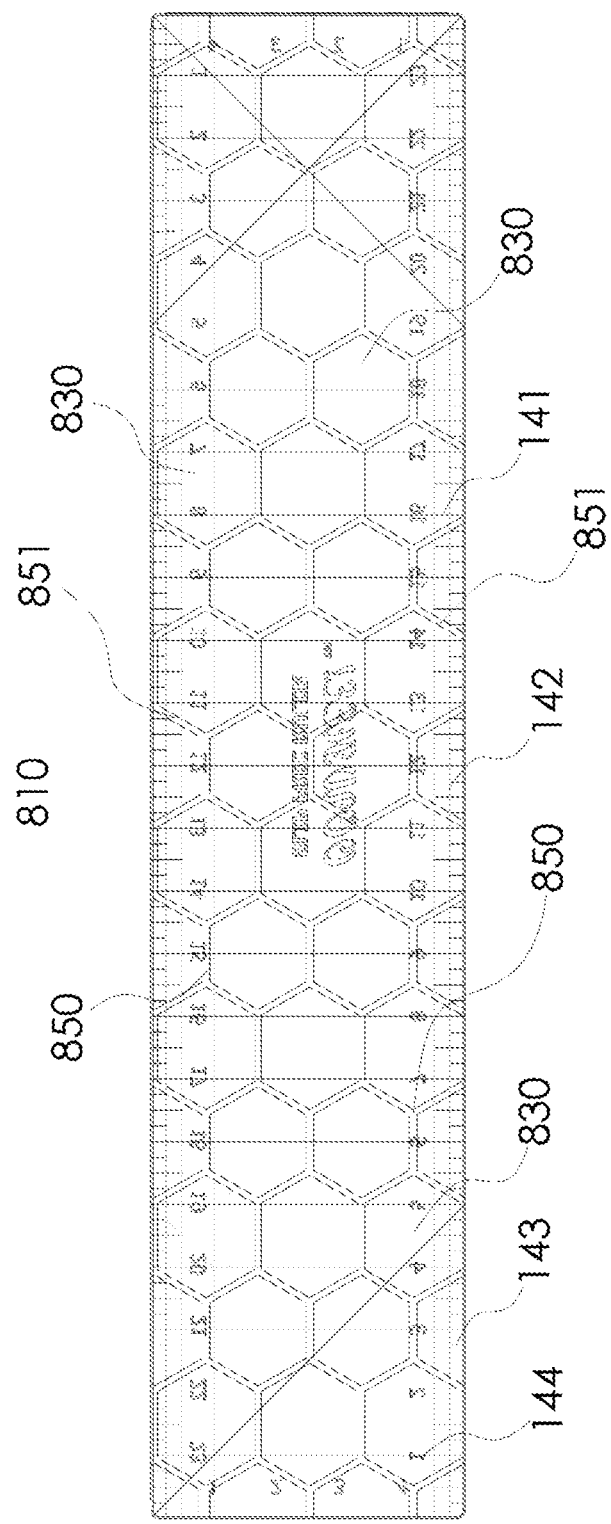
FIG. 14 shows a bottom view of the embodiment of FIG. 12.

FIG. 14 shows a bottom view of the quilting ruler 810 of FIG. 12. The markings 140, including 1" markings 141, ½" markings 142, ¼" markings 143, and numerals 144 are visible through the translucent coating layer 830 and the transparent ruler base 820. In this embodiment, gaps 850 are defined by the coating layer 830 and separate substantially hexagonal sections of coating layer 830. The gaps may be formed through the use of a number of different methods, such as using a template or masking structures 851 to prevent application of the spray of the coating layer 830 to the bottom surface of the ruler base 820. The gaps may also be formed by spraying or painting a pattern of a powder or liquid onto the bottom of the ruler base 820 which prevents the coating layer 830 from adhering to the ruler base 820 where applied, with only the hexagonal pattern of the coating layer 830 remaining after manufacture of the quilting ruler 810. Alternatively, the entire bottom surface of the ruler base 820 may have a coating layer 830 applied, which then has gaps mechanically created in it, selectively removing material so as to leave separate sections of coating layer 830.

Figure 15:
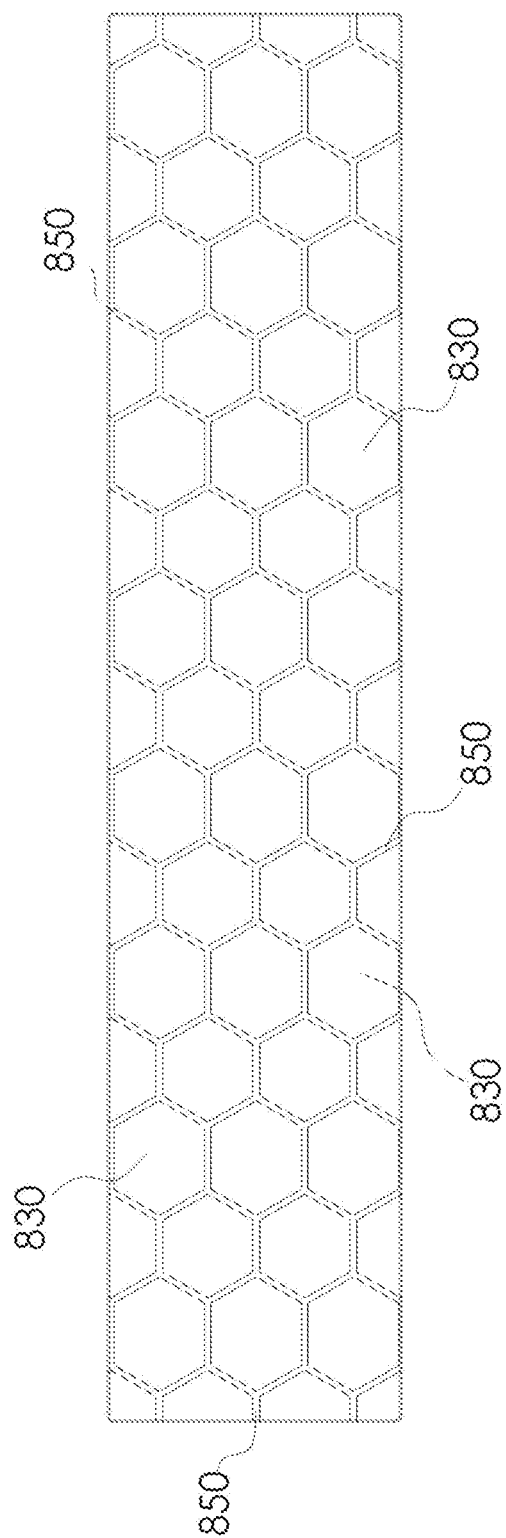
FIG. 15 shows a bottom view of the applied coating of the embodiment of FIG. 12.

FIG. 15 shows a bottom view of the coating layer 830 of FIG. 12. In this embodiment, separate sections of coating layer 830 define gaps 850. The sections of coating layer 830 are predominantly hexagonal, though some sections are only portions of a hexagonal shape.

Figure 16:
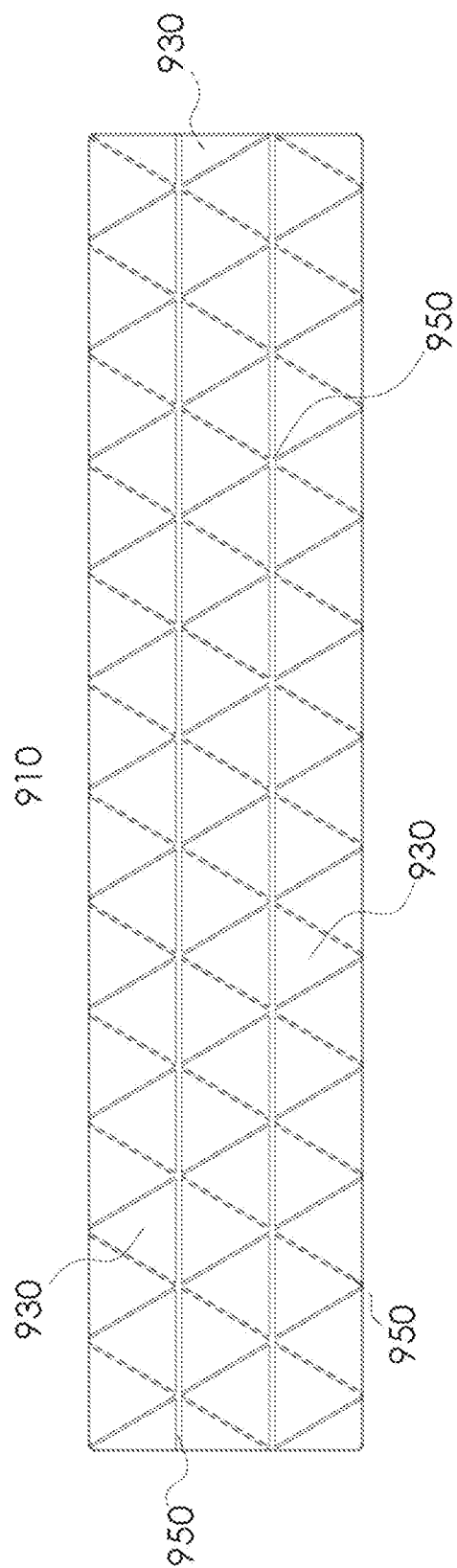
FIG. 16 shows a bottom view of the applied coating of an alternate embodiment of the present disclosure.

FIG. 16 shows a bottom view of the coating layer 930 of an alternate embodiment of quilting ruler 910. In this embodiment, separate triangular sections of coating layer 930 define gaps 950. Though the sections of coating layer 930 are predominantly triangular, some sections are only portions of a triangular pattern.

Figure 17:
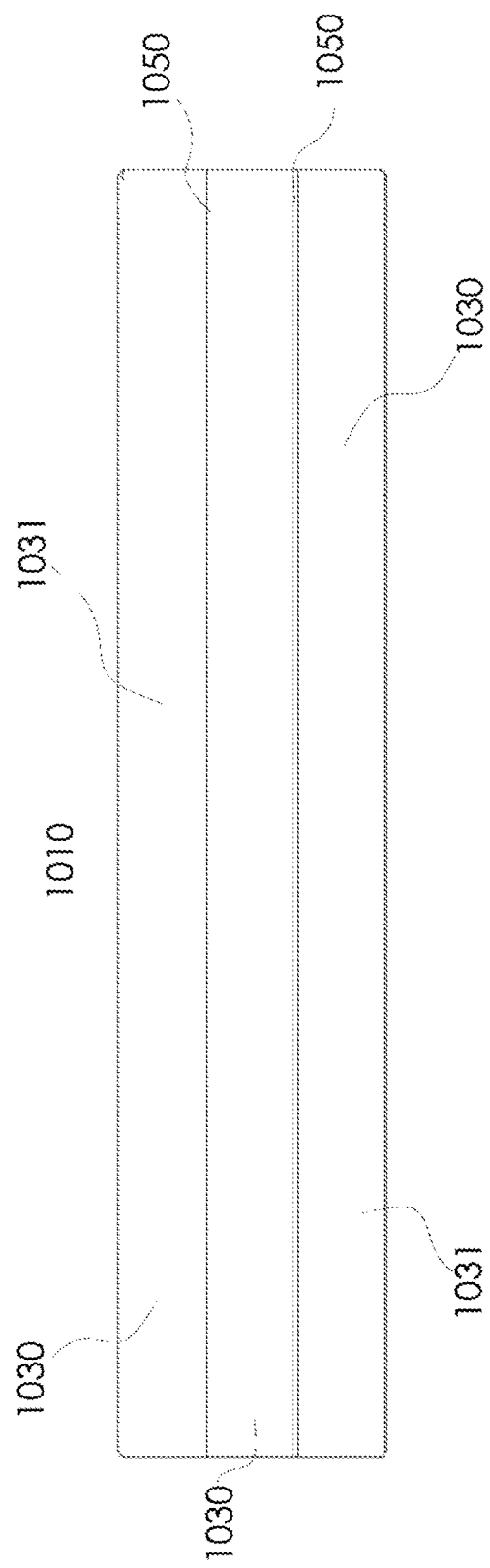
FIG. 17 shows a bottom view of the applied coating of another alternate embodiment of the present disclosure.

FIG. 17 shows a bottom view of the coating layer 1030 of an alternate embodiment of quilting ruler 1010. In this embodiment, the coating layer 1030 is divided into predominantly horizontal or lengthwise segments along the bottom surface of the quilting ruler 1010. The lengthwise segments of the coating layer 1030 define gaps 1050. A coating or layer of material which reduces the adhesion of the coating layer 1030 may be applied to the bottom surface of the ruler base, allowing separate sections of the coating layer 1030 to be peeled off while retaining other sections. Alternately, a coating or layer of material 1031 which increases adhesion may also be applied. The gap 1050 may not be necessary if additional coatings 1031 are used. Such additional coatings 1031 may be applied to any of the embodiments of this disclosure. Though the embodiment in FIG. 17 depicts three sections of lengthwise coating layer 1030, as with all embodiments of this disclosure, it is understood that any number of sections may actually be used without deviating from the spirit or intent of the disclosure.

Figure 18:
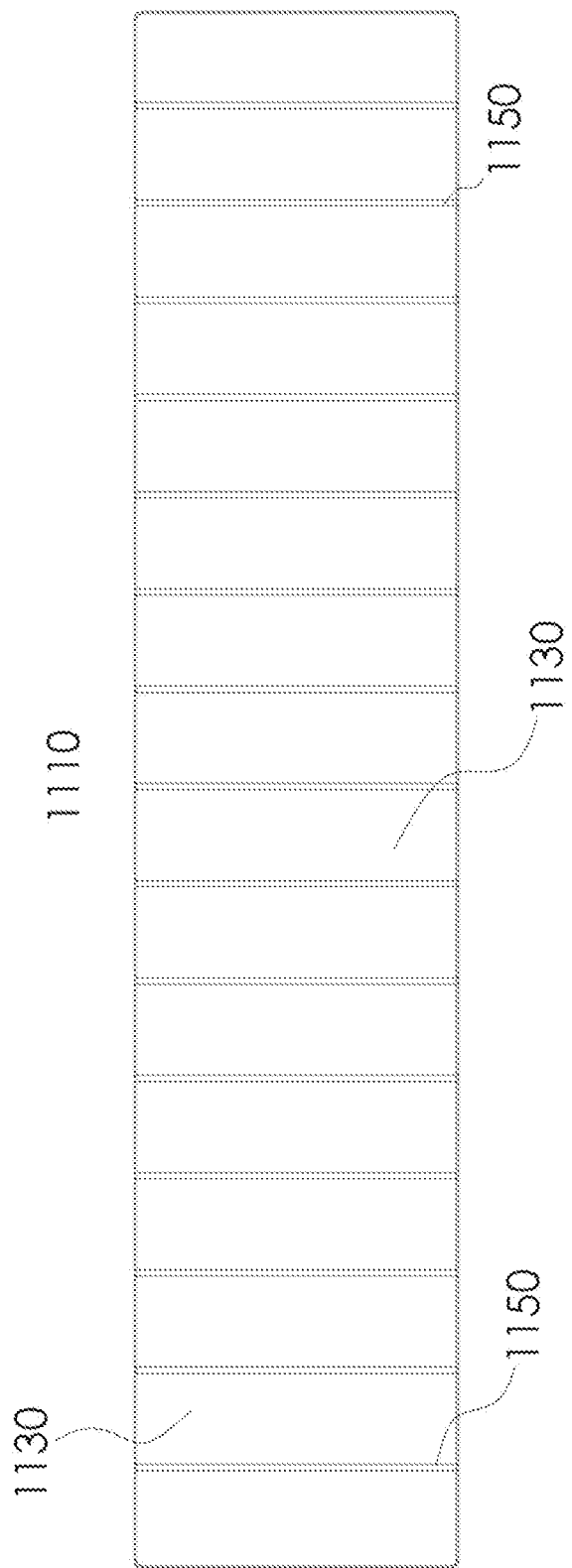
FIG. 18 shows a bottom view of the applied coating of another alternate embodiment of the present disclosure.

FIG. 18 shows a bottom view of the coating layer 1130 of an alternate embodiment of the quilting ruler 1110. In this embodiment, the coating layer 1130 is divided into predominantly vertical or widthwise segments along the bottom surface of the quilting ruler 1110. The widthwise segments of the coating layer 1130 define gaps 1150.

Figure 19:
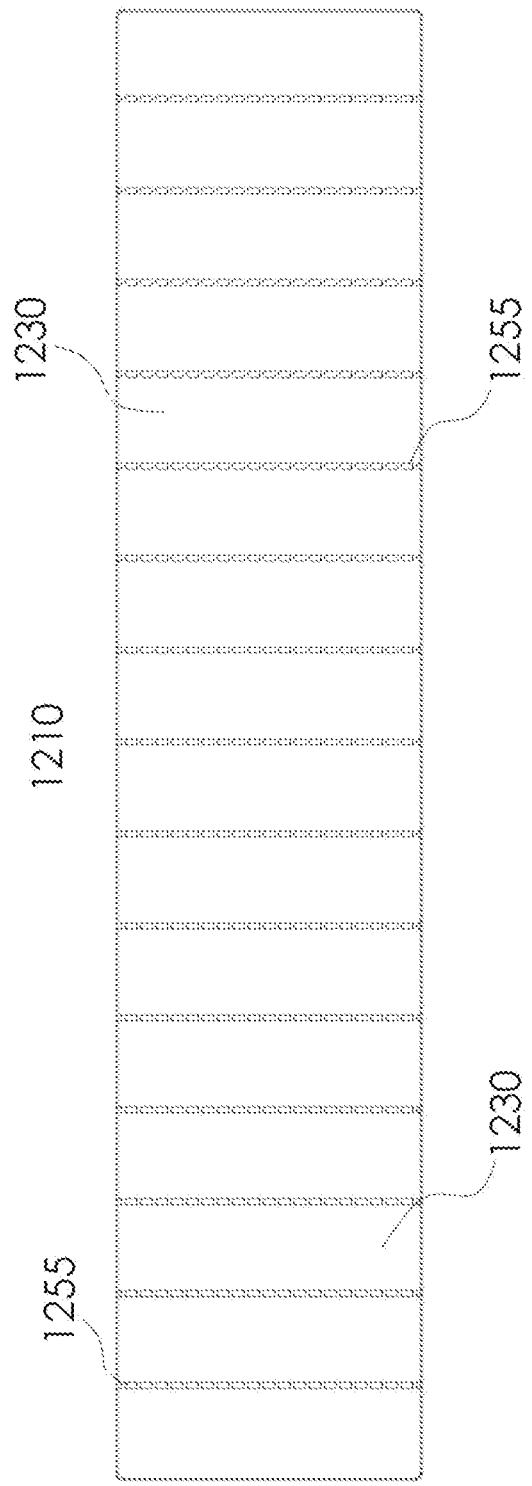
FIG. 19 shows a bottom view of the applied coating with scoring separations of an embodiment of the present disclosure.

FIG. 19 shows a bottom view the coating layer 1230 of an alternate embodiment of the quilting ruler 1210. The coating layer 1230 comprises scoring points 1255 which direct separation of the coating layer 1230 into sections when being peeled off of the bottom of the quilting ruler 1210. The scoring points 1255 may pass completely through the coating layer 1230 to the bottom surface of the ruler base 1220, or they may only penetrate part way through the coating layer 1230, creating a weakened area in the coating layer 1230 which allows sections of the coating layer 1230 to tear away from the remainder of the coating layer 1230 when being peeled off of the quilting ruler 1210. The scoring points 1255 may be created through a template or masking means when applying the coating layer 1230 to the bottom surface of the ruler base 120, or may be formed in the coating layer 1230 after the coating layer 1230 is applied, such as by means of mechanically compressing, stamping, displacing, or removing material from the coating layer 1230 after application.

Figure 20:
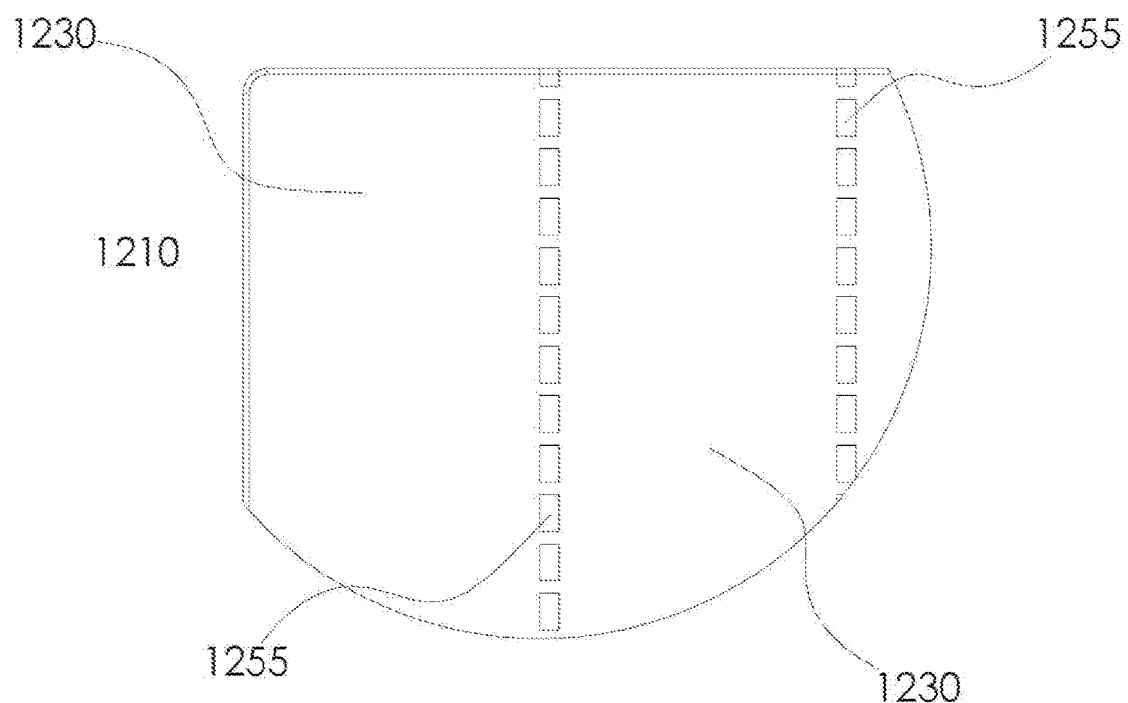
FIG. 20 shows a detail view of the embodiment of FIG. 19.

FIG. 20 shows a detail view of the coating layer 1230 of FIG. 19. The scoring points 1255 may vary in spacing and orientation, depth, and size, so as to achieve a desired resistance to separation during peeling of the coating layer 1230 from the quilting ruler 1210.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention. Accordingly, various modifications, adaptations and alternatives may occur to one skilled in the art without departing from the spirit of the invention and scope of the claimed coverage.

What is claimed is:

1. A measuring device, comprising:
a substantially rigid translucent base with a top surface and a bottom surface; and
a translucent removable coating layer comprising at least one constituent and which is applied to the bottom surface of the substantially rigid translucent base while the at least one constituent is in liquid form;
wherein the translucent removable coating layer resists movement of fabric when in contact with the fabric, the translucent removable coating layer is substantially flexible, the translucent removable coating layer comprises a plurality of removable sections which are configured to be selectively removable, and the liquid form of the translucent removable coating layer is configured to cure at room temperature under ambient lighting.

2. The measuring device according to claim 1, further wherein the substantially rigid translucent base is transparent.

3. The measuring device of claim 1, further wherein the top surface of the substantially rigid translucent base comprises a plurality of lines.

4. The measuring device of claim 3, further wherein the plurality of lines is a single color.

5. The measuring device of claim 1, further wherein at least one of the plurality of removable sections is substantially rectangular.

6. The measuring device of claim 1, further wherein at least one of the plurality of removable sections is substantially triangular.

7. The measuring device of claim 1, further wherein at least one of the plurality of removable sections is substantially hexagonal.

8. The measuring device of claim 1, further wherein the at least one constituent of the translucent removable coating layer is applied to the bottom surface of the substantially rigid translucent base through a template which is configured to leave at least one gap between at least two of the plurality of removable sections.

9. The measuring device of claim 1, further wherein material is mechanically removed from the translucent removable coating layer so as to create weak points or gaps on the coating layer.

10. The measuring device of claim 1, further wherein the translucent removable coating layer comprises a spray-on rubberized material.

11. The measuring device of claim 1, further wherein the translucent removable coating layer comprises a petroleum-based material.

12. A method of making a device for measuring fabric, comprising:
providing a substantially rigid translucent base with a top surface and a bottom surface;
marking the substantially rigid translucent base with a plurality of lines; and
applying a liquid which cures to create a translucent, substantially flexible, removable coating layer that resists the movement of fabric to the bottom surface of the substantially rigid translucent base in which the translucent, substantially flexible, removable coating layer that resists the movement of fabric comprises a plurality of sections which are selectively removable.

13. The method of claim 12, wherein the liquid is applied through a template creating the plurality of sections which are selectively removable.

14. The method of claim 12, further comprising a step of mechanically scoring the removable coating layer so as to create weak points on the removable coating layer enabling selective removal of the plurality of sections which are selectively removable.

15. The method of claim 12, further comprising a step of mechanically creating gaps in the removable coating layer creating separation between separate sections of the plurality of sections which are selectively removable enabling selective removal of the plurality of sections which are selectively removable.

16. The method of claim 12, further comprising a step of selectively applying a coating of material to the bottom surface of the substantially rigid translucent base before applying the liquid which cures to create a translucent, substantially flexible, removable coating layer, wherein the coating material prevents the curing of the liquid which cures to create a translucent, substantially flexible, removable coating layer or reduces the adhesion of the liquid which cures to create a translucent, substantially flexible, removable coating layer to the bottom surface of the substantially rigid translucent base separating at least one first cured area of the liquid which cures to create a translucent, substantially flexible, removable coating layer from at least one second cured area of the liquid which cures to create a translucent, substantially flexible, removable coating layer by at least one first uncured area of the liquid which cures to create a translucent, substantially flexible, removable coating layer enabling selective removal of the plurality of sections which are selectively removable when the plurality of sections which are selectively removable have cured.

17. The method of claim 12, wherein the bottom surface of the substantially rigid translucent surface is masked before the liquid which cures to create a translucent, substantially flexible, removable coating layer is applied preventing adhesion of the liquid which cures to create a translucent, substantially flexible, removable coating layer to the bottom surface of the substantially rigid translucent surface where the substantially rigid translucent surface has been masked, creating a plurality of selectively peelable sections when cured.

18. The method of claim 12, further comprising a step of selectively applying a coating of adhesive material to the bottom surface of the substantially rigid translucent base before applying the liquid which cures to create a translucent, substantially flexible, removable coating layer, and further wherein the adhesive material has been selected to provide improved adhesion of the liquid which cures to create a translucent, substantially flexible, removable coating layer to the translucent base compared to the adhesion of the liquid which cures to create a translucent, substantially flexible, removable coating layer directly to the translucent base so as to separate at least one first cured area of the liquid which cures to create a translucent, substantially flexible, removable coating layer and is adhered to the translucent base by way of the adhesive material from at least one second cured area of the liquid which cures to create a translucent, substantially flexible, removable coating layer and is adhered to the translucent base by way of the adhesive material by at least one first cured area of the liquid which cures to create a translucent, substantially flexible, removable coating layer and is not adhered to the translucent base by way of the adhesive material so as to enable selective removal of the plurality of sections which are selectively removable when the plurality of sections which are selectively removable have cured.

19. A device for measuring, marking, or cutting fabric, comprising:
   a substantially rigid transparent base with a top surface and a bottom surface; and
   a translucent removable coating layer which is applied to the bottom surface of the substantially rigid transparent base while in a liquid form;
   wherein the top surface of the substantially rigid transparent base comprises a plurality of lines which are all a single color, the translucent removable coating layer resists movement of the fabric when in contact with the fabric, the translucent removable coating layer is substantially flexible and comprises a rubberized material, and the translucent coating layer comprises a plurality of removable sections which are configured to be selectively removable.

* * * * *